(12) United States Patent
Runyon et al.

(10) Patent No.: US 7,656,296 B2
(45) Date of Patent: Feb. 2, 2010

(54) ANTENNA FOR MOBILE WIRELESS DATA COLLECTION SYSTEM

(75) Inventors: Donald L. Runyon, Duluth, GA (US);
William H. Roeder, Norcross, GA (US);
Richard W. Sorenson, Jr., Atlanta, GA (US)

(73) Assignee: EMS Technologies, Inc., Norcross, GA (US)

( * ) Notice: Subject to any disclaimer, the term of this patent is extended or adjusted under 35 U.S.C. 154(b) by 164 days.

(21) Appl. No.: 11/402,798

(22) Filed: Apr. 13, 2006

(65) Prior Publication Data

US 2006/0255948 A1 Nov. 16, 2006

Related U.S. Application Data

(60) Provisional application No. 60/680,925, filed on May 13, 2005, provisional application No. 60/718,947, filed on Sep. 20, 2005.

(51) Int. Cl.
*G08B 13/14* (2006.01)
(52) U.S. Cl. ............... 340/572.7; 340/10.1; 340/539.21
(58) Field of Classification Search ... 340/572.1–572.9, 340/10.1, 10.52, 539.2, 539.11, 539.13; 235/384–385; 705/22, 28, 29
See application file for complete search history.

(56) References Cited

U.S. PATENT DOCUMENTS

| | | | |
|---|---|---|---|
| 4,771,288 A * | 9/1988 | Johnson | 342/188 |
| 5,604,485 A | 2/1997 | Lauro et al. | |
| 5,608,417 A | 3/1997 | de Vall | |
| 5,729,697 A | 3/1998 | Schkolnick et al. | |
| 6,057,765 A * | 5/2000 | Jones et al. | 340/572.2 |
| 6,166,638 A | 12/2000 | Brady et al. | |
| 6,332,098 B2 | 12/2001 | Ross et al. | |
| 6,496,806 B1 * | 12/2002 | Horwitz et al. | 705/28 |
| 6,600,418 B2 * | 7/2003 | Francis et al. | 340/572.1 |
| 6,669,089 B2 * | 12/2003 | Cybulski et al. | 235/385 |
| 6,703,935 B1 | 3/2004 | Chung et al. | |
| 6,750,771 B1 | 6/2004 | Brand | |
| 6,788,204 B1 * | 9/2004 | Ianelli et al. | 340/572.1 |
| 6,809,703 B2 | 10/2004 | Serra | |
| 7,036,734 B2 * | 5/2006 | Baker | 235/451 |
| 7,121,457 B2 * | 10/2006 | Michal, III | 235/375 |
| 7,151,979 B2 | 12/2006 | Andersen et al. | |
| 7,155,304 B1 | 12/2006 | Charych | |
| 7,221,269 B2 * | 5/2007 | Onderko et al. | 340/539.13 |
| 7,233,241 B2 * | 6/2007 | Overhultz et al. | 340/539.2 |
| 7,236,851 B2 | 6/2007 | Charych | |
| 7,243,476 B2 | 7/2007 | Schneider | |
| 7,339,541 B2 * | 3/2008 | Schadler | 343/772 |

(Continued)

FOREIGN PATENT DOCUMENTS

NL 9401836 6/1996

*Primary Examiner*—Daniel Previl
(74) *Attorney, Agent, or Firm*—Hogan & Hartson LLP (57) ABSTRACT

The present invention provides an antenna system for reading RFID tags and/or transmitting and receiving wireless network signals, including for example wireless local area network (WLAN) signals, in a material handling environment. A ruggedized antenna can be mounted on the load backrest of a lift truck and configured to accomplish the reading of RFID tags that indicate particular pallet storage locations and the reading of RFID tags that indicate warehouse locations, such as specific loading docks. The antenna system can also be configured to accomplish transmitting and receiving WLAN signals for communication with a warehouse.

51 Claims, 9 Drawing Sheets

U.S. PATENT DOCUMENTS

| | | |
|---|---|---|
| 2002/0130817 A1* | 9/2002 | Forster et al. ............... 343/770 |
| 2004/0102870 A1 | 5/2004 | Andersen et al. |
| 2005/0052281 A1 | 3/2005 | Bann |
| 2005/0076816 A1 | 4/2005 | Nakano |
| 2005/0200457 A1 | 9/2005 | Bridgelall et al. |
| 2006/0058913 A1 | 3/2006 | Andersen et al. |
| 2006/0132312 A1* | 6/2006 | Tavormina ............... 340/572.7 |
| 2006/0208893 A1 | 9/2006 | Anson et al. |
| 2006/0220872 A1 | 10/2006 | Brown et al. |
| 2006/0287760 A1 | 12/2006 | Charych |

* cited by examiner

505
providing location RFID tags in inventory storage area to represent unique locations

510
providing product RFID tags on inventory to represent inventory contents

515
reading information from location and product RFID tags using antenna having a radiating element on a load backrest

520
communicating RFID tag information to inventory management system

ANTENNA FOR MOBILE WIRELESS DATA COLLECTION SYSTEM

CROSS REFERENCE TO RELATED APPLICATIONS

This application claims priority under 35 U.S.C. §119(e) from U.S. Provisional Patent Application Nos. 60/680,925, filed on May 13, 2005, and 60/718,947, filed on Sep. 20, 2005, both of which are incorporated herein by reference.

STATEMENT REGARDING SPONSORED RESEARCH OR DEVELOPMENT

Not Applicable.

REFERENCE TO SEQUENCE LISTING

Not Applicable.

BACKGROUND OF THE INVENTION

1. Field of the Invention

This invention relates generally to antenna systems, and more particularly to antennas for use with mobile wireless data collection systems.

2. Description of Related Art

Current "best practices" employed in the movement and tracking of goods in warehouses and distribution centers include the use of barcode-based data collection and wireless networked computers on lift trucks and other mobile material handling equipment. While these technologies have greatly enhanced the efficiency and accuracy of material handling operations over recent decades, they still fundamentally rely on manual data collection activity in the validation of material movement.

For greater efficiencies the data collection needs to be synchronized with operator directives and activity. Operators are typically presented with instructions from the warehouse management software application on the screen of a mobile wireless computer on the lift truck. Upon completion of the required action, the operator typically enters data through a bar code scan or keyboard entry to confirm accurate completion of the task. The information is transmitted over a wireless connection to the application on a network server. The application may then assign the operator the next task. Thus, the application and process require real-time, precise data, appropriate to the task and synchronous with operator actions and application instructions.

Furthermore, almost all full pallet load moves require two basic data collection elements: (1) load identification and (2) location identification. If, for instance, a lift operator is instructed to drive to a particular location, he may then be required to scan a bar code to verify that he has arrived at the correct location. If he is then directed to pick up a pallet, he may then be required to scan a bar code on the pallet load to identify the load to the application software. A subsequent instruction to deposit the load at a particular location would typically be followed by a bar code scan identifying the deposit location to validate task compliance.

The use of radio frequency identification (RFID) technology presents great promise for automating the data collection process. A RFID system typically uses a RFID tag reader to query a RFID tag attached to an object. The RFID tag provides certain information associated with the tagged object. Prior attempts to implement RFID technology in a warehouse environment have typically failed to fully take into account the observations mentioned above.

For example, the use of RFID "portals" at dock doors in warehouses is typically intended to deliver identification of the load passing through the portal and to designate the location (dock door) identification through the reader's network address. However, this is seldom synchronized with lift operator instructions and application instructions to the operator. Also, the attractive characteristic of RFID as a solution approach is that it can be automated easily and does not require "line of sight" to identify items or locations. RFID systems can, and typically do, read multiple tags; but this often results in extraneous data, which fails to deliver discrete, precise data as required by the application. Thus, the use of RFID systems in warehouse inventory control presents a unique set of problems that have to be resolved to ensure efficient operation of the RFID system.

To be successful for use in a warehouse inventory control, the RFID-based solution should address the observations above. A first key will be that the RFID implementation becomes inherently part of the synchronized activities of the lift operation itself. A second key will be that the RFID implementation collects precisely the data expected and required at each step of the lift operation. The RFID tag readers must, therefore, be able to communicate effectively to identify RFID tags, while simultaneously transmitting tag information to a warehouse management system for processing and receiving instructions.

With specific reference to material handling control, the RFID system has to efficiently operate in a harsh operating environment that is typical of a warehouse. RFID tag readers are installed at various locations in the material storage facility. Some of these locations are stationary mounting locations, such as that of a RFID tag reader installed on a post located adjacent to a conveyor belt. Other locations are mobile mounting locations, such as that of a RFID tag reader installed on a lift truck. The RFID tag reader mounted on the lift truck is typically operated to communicate with RFID tags attached to various objects transported by the lift truck as well as stationary objects that may be located on a storage shelf. The results of the tag reads are typically transmitted to the warehouse management system over a wireless local area network.

Mounting the RFID tag reader upon the lift truck involves several operational as well as logistical considerations. Consequently, prior to installation of the RFID tag reader, an acceptable mounting location has to be identified such that installation and operation of the RFID tag reader will not interfere with, nor be affected by, the operation of the forklift. Particularly, antennas for communicating with RFID tags and communicating with the material handling system should be mounted in a manner that addresses multiple factors. Some of these factors include use of low RF power to limit tag readings to a single tag; optimal direction of the RF power pattern to prevent reading unintended tags; rugged construction to withstand typical material handling activities; locating antennas near desired tags to permit use of lower RF power; mounting antennas to limit obstructions to driver visibility; and minimizing cable routing. In other words, RF power control through transmit power level control and RF power distribution through antenna pattern shaping are elements of an effective RFID material handling system.

There remains a need in the industry for a for an antenna system that addresses the aforementioned needs.

SUMMARY OF THE INVENTION

The present invention provides an antenna system for reading RFID tags and/or transmitting and receiving wireless network signals, including for example wireless local area network (WLAN) signals, in a material handling environment. With use of modern inventory management systems, RFID location tags are typically included in numerous locations throughout the material handling environment, including, for example, at inventory storage locations and loading docks in a warehouse. RFID tags can be used to identify products and locations in the warehouse and this information can be synchronized with lift truck operations and transmitted via a WLAN connection to a warehouse or inventory management system that monitors and/or controls warehouse operations.

The antenna system can be configured, in certain embodiments and without limitation, to read RFID tags that indicate particular pallet storage locations and/or pallet contents and to read RFID tags that indicate warehouse locations, such as specific loading docks. In certain embodiments, a ruggedized, essentially-upward-looking antenna can be mounted on the load backrest (or load rest) of a lift truck (e.g., forklift, clamp truck, pallet truck, hand truck, or other mobile material handling equipment). In certain embodiments, the antenna's structure and location on the load rest permit use of localized, low-level RF power, which helps to ensure reading of a desired location tag without reading unintended nearby tags. In other certain embodiments, the antenna effectively provides a limited beam width that enables reading of RFID tags mounted overhead (including, for example, on a doorjamb crosspiece) without reading unintended nearby tags through antenna pattern shaping and RF transmit power control. Among other embodiments, the antenna system may incorporate a flared-notch radiator design that allows for transmission of essentially upward-looking RFID signals. Other embodiments that have an opening to radiate RF signals are contemplated, such as an inverted "F" shaped antenna, a slot-type antenna, or a waveguide antenna mounted atop a load backrest.

In certain embodiments, the antenna system can be configured to accomplish, without limitation, transmitting and receiving wireless network signals for communication with a warehouse management system. Embodiments of the antenna system may incorporate openings within the antenna system structure for transmission and reception of WLAN signals (e.g., 2.4 GHz frequency signals). Integrating the antenna into the top or upper portion of a load backrest provides a relatively high point to maximize signal coverage and simplifies cable-routing with an associated RFID tag reading system. Openings for WLAN transmission/receiving may be in the form of smaller slots or notch designs. The ruggedized load backrest antenna may incorporate RFID or WLAN capabilities individually or in combination.

In one embodiment, the invention provides an antenna system for use on the load rest of a powered industrial truck. The antenna system includes a radiating element of conducting material that has a substantially uniform voltage distribution at low frequency across the radiating element (e.g., less than 1 MHz) and one or more radio frequency feed lines, each feed line being coupled across an opening of the planar radiating element. The planar radiating element is configured to be affixed to a portion of the load rest so as to project at least one radio frequency signal in an essentially upward direction.

The opening(s) of said planar radiating element may be in the form of a flared notch or other configuration that allows for upward transmission of an RF signal.

In another embodiment of the invention, a load backrest for a lift truck is provided. The load backrest includes a frame adapted for connection to an elevating carriage and extending in a generally vertical plane above the carriage. Mounted or otherwise integrated into the frame is an antenna mounted in essentially the same vertical plane as said frame. The antenna has a radiating element of conducting material configured to have substantially uniform voltage distribution across the radiating element at low frequency and having at least one opening, wherein said antenna projects at least one radio frequency signal.

Yet another embodiment of the invention provides a data collection system for a lift truck with a lift carriage. The data collection system has a load backrest mounted to the lift carriage. The load backrest includes an integrated antenna with a radiating element configured to have substantially uniform voltage distribution across the radiating element at a low frequency and having an opening configured for projecting a radio frequency signal. The data collection system also has a feed line coupled to the opening to communicate a signal for reading a RFID tag and a RFID tag reading system located elsewhere on the lift truck that includes a RFID radio and a central processing unit (CPU). The communication system may also include a power source for both the reader and the upward-looking antenna.

In another embodiment, a method of collecting inventory tracking data in a material handling environment is provided. The method includes the steps of providing location RFID tags in an inventory storage area, wherein the location of each RFID tag represent a unique location in the inventory storage area, and providing product RFID tags on the inventory, wherein the product RFID tags represent inventory contents. Additional steps include reading information from the location RFID tags and the product RFID tags using an RF signal transmitted from an antenna having a radiating element on a load backrest of a lift carriage and having a substantially uniform voltage distribution across the radiating element at low frequency, and communicating the RFID tag information to an inventory management system.

In a further embodiment, a method is provided for reading an overhead RFID tag using an antenna mounted on a lift truck. The method includes the steps of projecting in a predominantly upward direction a first RF signal that has, at half power, a major lobe with a transverse cross-section that has a ratio of major to minor dimensions greater than or equal to 2; receiving a second signal from the RFID tag; and transmitting the second signal to a RFID reader. The minor dimension of the major lobe is aligned with the primary plane of the load backrest and the major dimension of the major lobe is aligned to the primary direction of travel of said lift truck.

In yet a further embodiment a RFID antenna for a lift truck is provided. The RFID antenna has a planar radiating element on an essentially-vertically-oriented load backrest. The radiating element is oriented transverse to the primary direction of travel of said lift truck. The antenna has a linear polarization aligned with the primary plane of the load back rest and projects an electromagnetic signal in predominantly an upward direction.

Another embodiment of the invention provides a WLAN antenna for a lift truck. The WLAN antenna has a planar radiating element on an essentially-vertically-oriented load backrest. The radiating element is oriented transverse to the primary direction of travel of said lift truck and has a linear polarization aligned with the primary plane of the load back rest.

In an additional embodiment, a dual band antenna element is provided. The antenna element includes a radiating element of conducting material that has a substantially uniform voltage distribution across the radiating element at low frequency. The radiating element has a first opening and a second opening. Also included is a first radio frequency feed line coupled across the first opening in the radiating element, to radiate a radio frequency signal at a first frequency in essentially an upward direction. A second radio frequency feed line is coupled across the second opening in the radiating element to project a second radio frequency signal.

Additional features of the invention will be set forth in the description which follows, and in part will be obvious from the description, or may be learned by practice of the invention. The features of the invention may be realized and obtained by means of the instrumentalities and combinations particularly pointed out hereinafter.

BRIEF DESCRIPTION OF FIGURES

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the particular embodiments of the present invention, examples of which are illustrated in the accompanying drawings.

Figure 1:
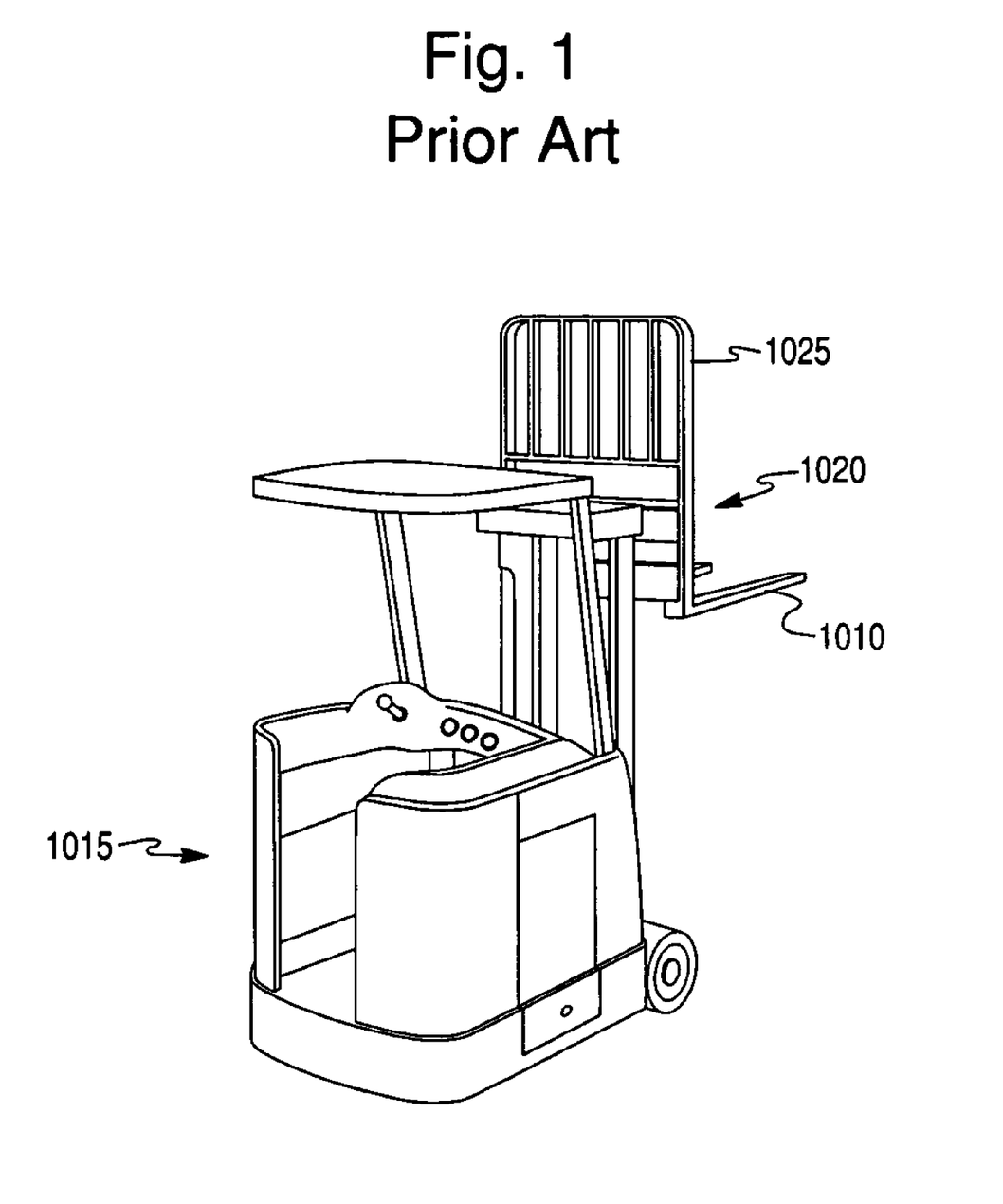
FIG. 1 provides a rear-side perspective view of a typical lift truck.

FIG. 1 provides a rear-side perspective view of a typical lift truck 1015, showing a lift carriage 1020 in an elevated position with conventional forklift tines 1010 and a conventional load backrest 1025 mounted to the lift carriage 1020. The lift truck 1015 of FIG. 1 is representative of numerous lift trucks that may be used in a material handling environment and configured for use in accordance with embodiments of the present invention.

Figure 2:
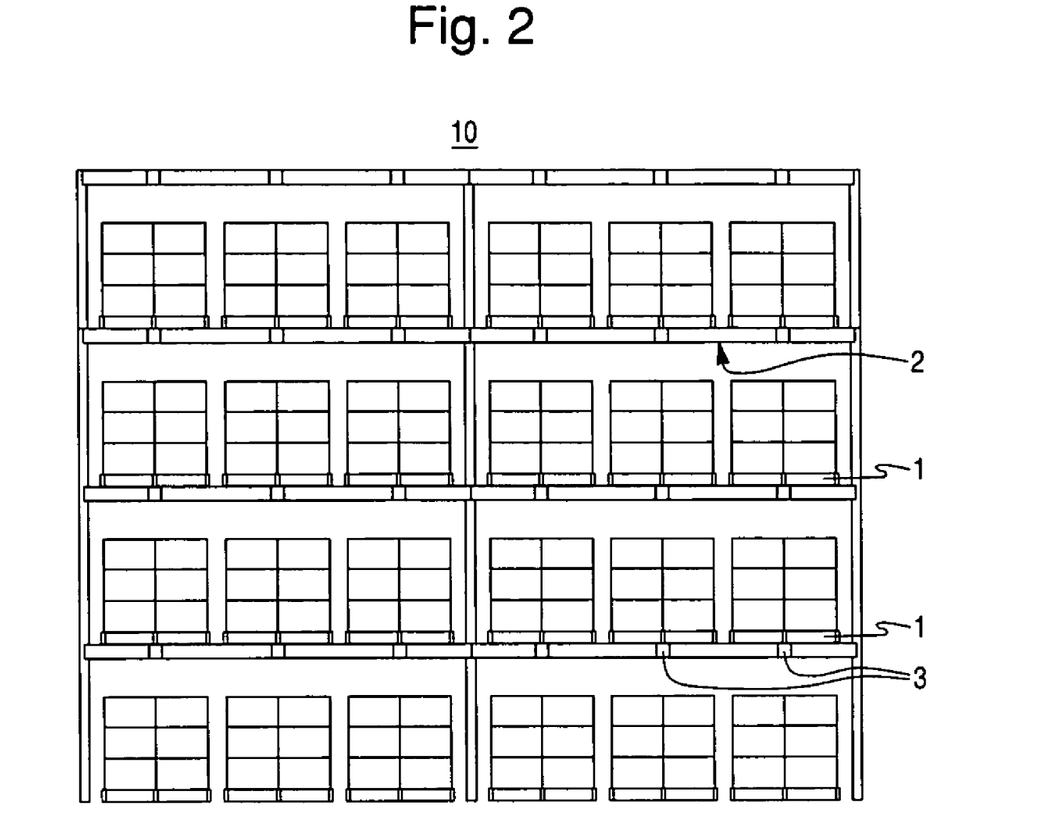
FIG. 2 provides a schematic of a typical pallet storage arrangement with RFID tags.

FIG. 2 shows a front view of a pallet storage area 10 in a warehouse that incorporates radio-frequency identification (RFID) technology. Multiple pallets 1 loaded with inventory are placed on or under a set of racks 2. Above each pallet location is a RFID tag 3 with information specific to identify the pallet location beneath each respective tag. The RFID tags 3 are generally passive (non-powered) tags; however active RFID tags are also contemplated within the scope of the present invention. When any pallet 1 is either placed on or removed from its respective storage location, the corresponding RFID tag 3 is to be "read" by a RIFD tag reader (not shown) that communicates through a RIFD antenna (not shown, but discussed below). The location information in the RFID tag 3 is communicated to a warehouse or inventory management system that associates the contents of the pallet with the RFID tag 3 location. Thus, it is essential for efficient warehouse operations that the proper RFID tag 3 is read when a pallet is placed or removed from the racks 2. The RFID tags 3 in FIG. 2 are used to represent particular locations, which in the present example, are locations on storage racks 2. Other RFID tags (not shown) may be included on the actual pallets 1 or on the inventory itself in order to be able associate particular pallets or inventory with the locations represented by RFID tags 3.

Figure 3:
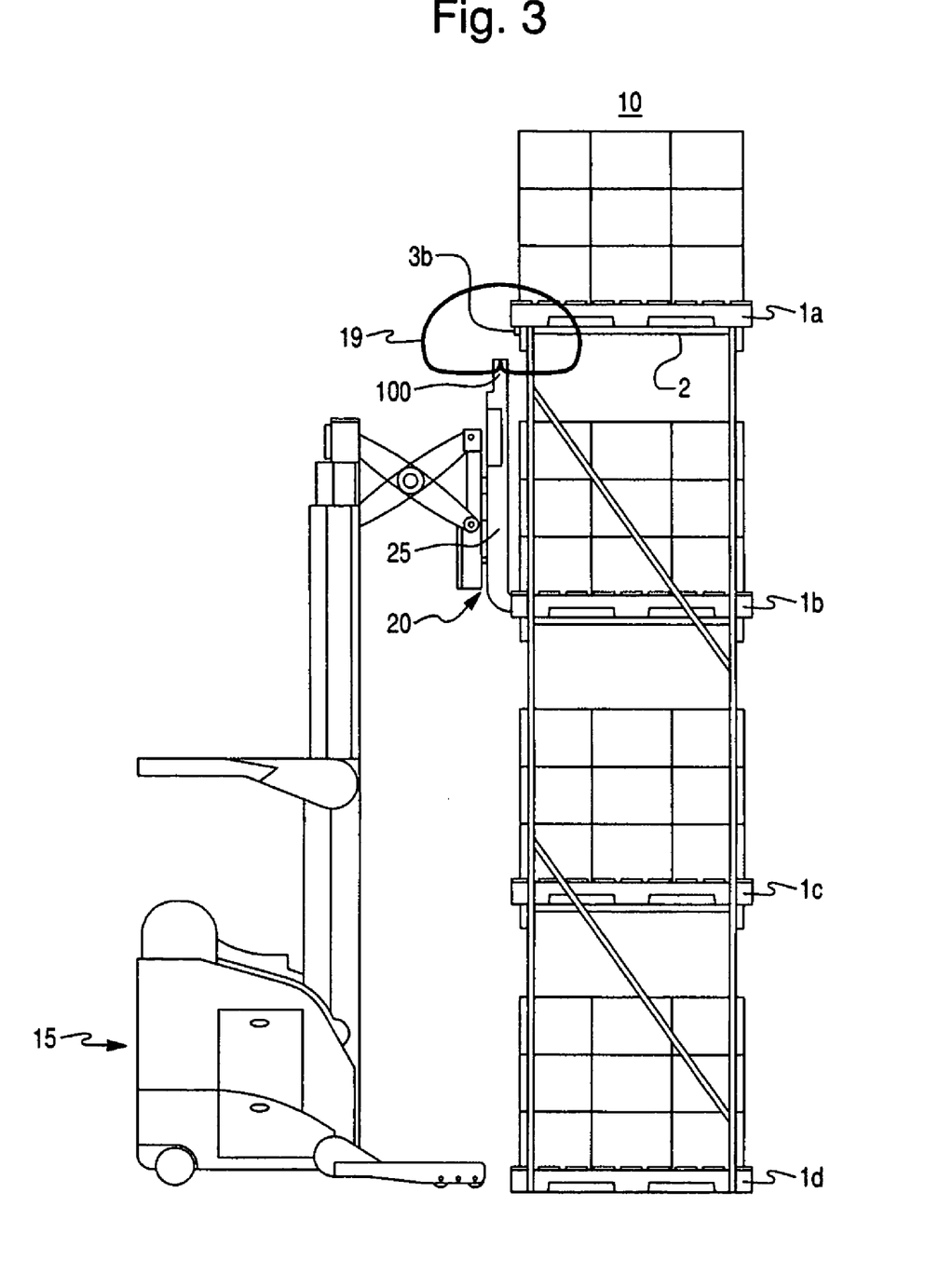
FIG. 3 provides a schematic of a lift truck with a load rest antenna according to one embodiment of the present invention at a pallet storage area equipped with RFID tags.

FIG. 3 shows a side view of pallet storage area 10 with a lift truck 15 having a lift carriage 20 that includes an antenna 100 in accordance with an embodiment of the present invention. The term lift truck as used herein may be a forklift, clamp truck, pallet truck, hand truck, or other mobile material handling equipment, either powered or manually driven. In FIG. 3 the lift carriage 20 is shown either placing or removing the pallet 1b from its respective location on the racks 2. The RIFD tag 3b above the pallet 1b is read by the antenna 100 that is located on a load backrest 25 of the lift carriage 20. The term load backrest (or, interchangeably, load rest) as used herein may be any generally upright surface mounted between the load to be lifted and the lift truck operator area. The surface of the load backrest 25 may be derived from a structure having openings or may be substantially a continuous surface. A typical load rest may be mounted to a lift carriage to simultaneously maneuver the forklift tines and the load rest of the lift truck. The antenna 100 emits a relatively low-power RFID signal that is typically in the UHF range of about 900 MHz, although other RFID frequencies may be used. A representative signal pattern or radiated power distribution 19 is shown emanating from antenna 100. More particularly, the antenna 100 emits a directed, low-power, essentially upward-looking signal that allows only the tag 3b associated with the lifted pallet 1b to be read, avoiding spurious or multiple tag reads. Some factors that contribute to a correct tag read include the location of the antenna, the primary direction on the antenna signal, the reader transmit power level, tag sensitivity, and the signal pattern or distribution respective to the spacing between RFID tags.

Figure 4A:
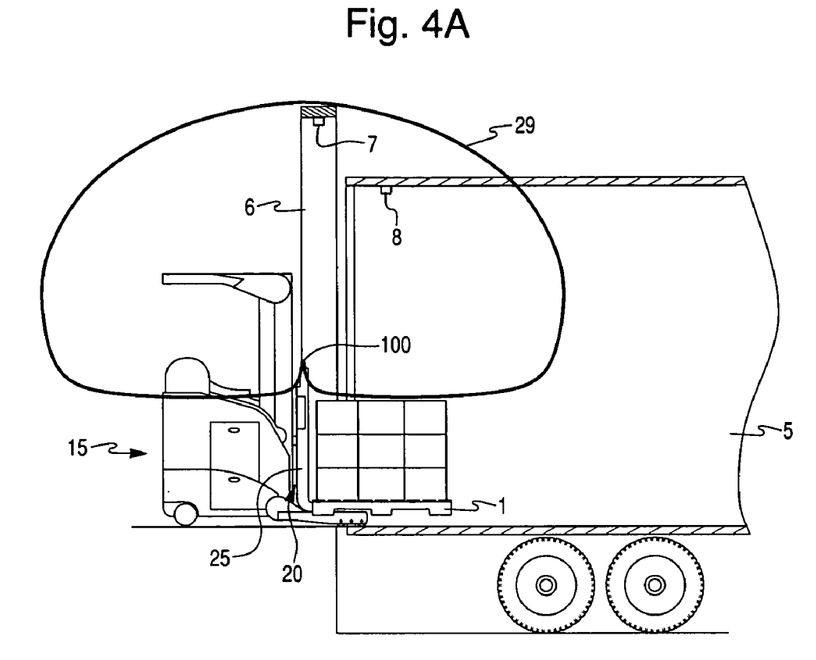
FIG. 4A provides a side view schematic of a lift truck with a load rest antenna according to one embodiment of the present invention at a loading dock door equipped with RFID tags.
Figure 4B:
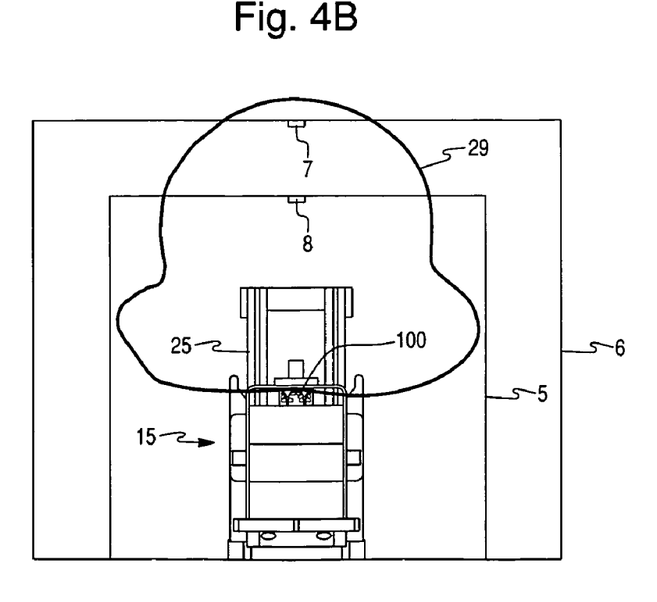
FIG. 4B provides a front view schematic of a lift truck with a load rest antenna according to one embodiment of the present invention at a loading dock door equipped with RFID tags.

Embodiments of the present invention may also be used to identify locations within a warehouse or other environment that a warehouse management system can then use to track inventory movement, for example, as occur in operations requiring moving goods from a trailer into a warehouse or vice versa. Referring now to FIGS. 4A and 4B, FIG. 4A shows a side view, and FIG. 4B shows a front view of a loading dock area with a lift truck 15 having a lift carriage 20 that includes an antenna 100 in accordance with an embodiment of the present invention. In the figures, the lift truck 15 with the lift carriage 20 is shown either placing or removing a pallet 1 onto or off of a mobile trailer 5. The trailer 5 also includes a downward-facing RFID tag 8 located on an unobstructed upper portion of the trailer. When entering the rear of the trailer 5, the lift carriage 20 passes under a dock door with a doorjamb 6. A RFID tag 7 is located on the underside of the doorjamb 6 crosspiece or in a similarly situated unobstructed portion near the dock door. It is understood that placement of RFID tag 7 and 8 can vary from the examples given. For example, a trailer 5 may have an overhead RFID tag 8 that is forward facing and effectively responds to a signal from a RFID interrogating source antenna 100 that is positioned in front of or below the RFID tag 8. Similarly, a doorjamb 6 may have a RFID tag 7 located on a front side of the doorjamb 6. The lift carriage 20 includes a load backrest 25 with the antenna 100 mounted thereon or integrated therein. In accordance with an embodiment of the present invention, the antenna 100 projects a signal pattern 29 in essentially an upward direction, with the read zone of the signal pattern limited to no more than approximately that of the doorjamb 6 opening so as to prevent reading of unintended nearby tags on adjacent dock doors. A tag read zone may be controlled by antenna pattern shaping and by transmit power level control. Signal pattern shaping is discussed in more detail with the text regarding FIG. 8. Still referring to FIGS. 4A and 4B, as the lift carriage 20 passes under the RFID tags 7, 8 the antenna 100 projects the signal 29 enabling reading of the tags 7, 8 for incorporation the tag embedded information into the warehouse management system.

Some embodiments of the invention may include an adjustable power level to allow for accurate RFID tag reading in different locations or environments. For example, in comparison with RFID tag reading associated with the loading of pallets shown in FIG. 3, the reading of RFID tags on a dock door or truck as shown in FIGS. 4A and 4B may require a more powerful signal from antenna 100. A maximum transmit power level of, for example, 1 watt may be desired for reading overhead RFID tags; while a low power reading of, for example, 100 milliwatts may be desirable during a pallet pick. Adjustable power levels are not required, but may be effective in some environments.

Figure 5A:
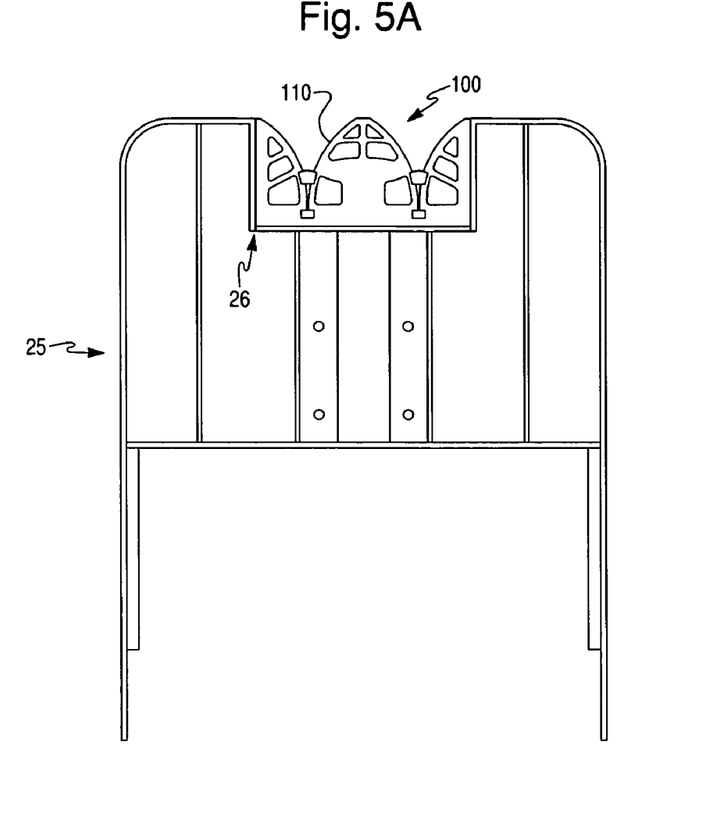
FIG. 5A provides a front view of a load backrest incorporating an upward looking antenna according to one embodiment of the present invention.

FIG. 5A shows an exemplary embodiment of antenna 100, having a planar element 110 mounted on a typical load backrest 25. In the embodiment shown on FIG. 5A, the antenna 100 is mounted directly to the load backrest 25. No insulator or dielectric interface is required to mount the antenna because the planar element 110 has a substantially uniform voltage across its entirety at low frequency (e.g., less than 1 MHz). For example, substantially uniform voltage distribution allows the planar element 110 to be DC ground. Substantially uniform low frequency voltage is also a feature of other contemplated embodiments such an inverted "F" shaped antenna, a slot-type antenna, a waveguide antenna, or other grounded antennas. In the case of the notch radiating element, the notch will have a voltage difference or potential distribution across the slot at the operational frequency and can have an effective impedance value greater than 20 Ohms with a bandpass or highpass characteristic. In other words, there is at least a band of frequency values that can support effective radiation from the notch and often the notch can be designed to support one or more bands greater than a transition frequency and effective radiation cannot be supported at a frequency below a transition frequency. The transition frequency value is a function of the notch size and shape. At a low frequency the notch will have an impedance value that is too low to effectively radiate RF energy from the notch. The impedance value at a low frequency will be less than one (1) Ohm. The antenna 100 can be affixed to the load backrest 25 by a number of suitable methods including welding, bolting, clamping, tongue-in-groove, or other mechanical means. Other means of affixing may include insulating means or electrically bonding means.

The planar element 110 is formed of a rugged material, such as quarter-inch (0.250") thick steel as shown in FIG. 5A. Lesser or greater thickness of the planar element may be suitable depending on the operating environment. Other materials can be used, such as solid aluminum, sheet steel, fiberglass (with an embedded metal mesh or fine microwave reflective material included in the fiberglass resin), steel mesh or a metal surface on a circuit board. The rugged design of planar element 110 allows for installation of the antenna 100 without a radome, cover, or other protection that is often required for conventional antennas. However, a radome could be used, if preferred, in some applications. The preferred embodiment of the antenna 100 is without a radome as the antenna is often in the line of view by the lift truck operator and an often opaque radome would block or obscure a viewing direction in some circumstances. The preferred embodiment of the antenna 100 can allow for mitigating blockage of view by inherent open spaces in the antenna 100 structure. The load backrest 25, as shown in FIG. 5A, includes a mounting area or cutout that is formed along the top of the load backrest 25. The mounting area may be formed by a frame 26 on the bottom and each side of the mounting area. The frame 26 may include mounting brackets or slots to receive the antenna 100. Other embodiments of the present invention are contemplated where the antenna 100 is integrally formed with the load backrest 25. Alternatively, the antenna could be mounted on the top of a conventional load backrest (e.g., a backrest without a specifically designed antenna-mounting area) by the inclusion of additional interface brackets atop the backrest.

Figure 5B:
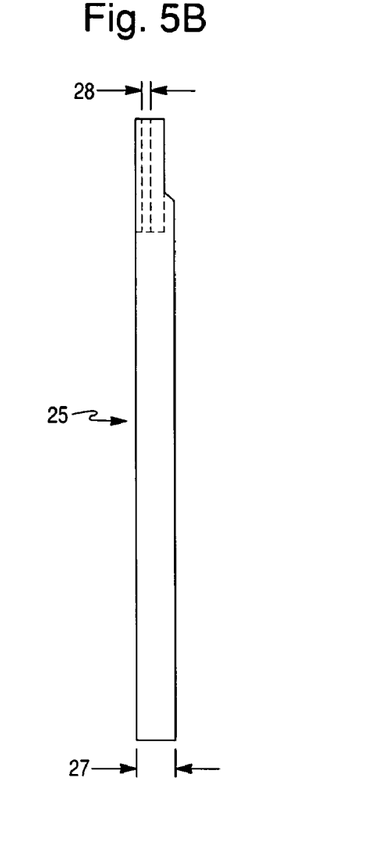
FIG. 5B provides a side view of a load backrest incorporating an upward looking antenna according to one embodiment of the present invention.

As shown in FIG. 5B, the thickness 28 of the antenna 100 is less than that of the thickness 27 of the load backrest 25. While the embodiments of FIGS. 5A and 5B use a quarter-inch (0.250") thickness for the planar element 110 of antenna 100 the material thickness may be increased or decreased. Primary factors in determining appropriate thickness include the desired structural strength and the ease of manufacture. For example, an eighth-inch (0.125") thickness may be appropriate in some light-duty material-handling applications. Generally, the thickness 28 of the antenna 100 should be less than the thickness 27 of the load backrest 25 to avoid unwanted protrusion into either the load area of the lift carriage or into the machinery behind the load rest. However, due to the extremely rugged steel construction of the planar element 110, damage to the antenna would not be a concern if it should be necessary to have the planar element extend out into the load area.

While FIG. 5A shows an embodiment of the antenna system that incorporates a flared-notch design, other antenna configurations may be suitable for mounting to a load backrest to allow for transmission of RFID signals. Other configurations may include an inverted "F" shaped antenna, a slot-type antenna, a waveguide antenna, or other antennas with an opening to project RF signals. These other configurations can implement similar features, such as ruggedized construction, substantially uniform voltage distribution at low frequencies across the radiating element, and low profile that could allow for an implementation similar to that of the configurations shown in greater detail hereafter.

Figure 6:
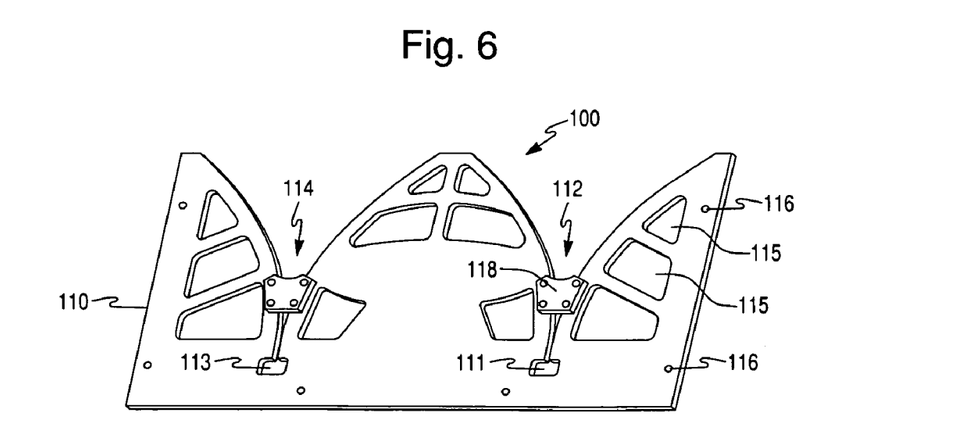
FIG. 6 provides a front perspective view of a flared notch antenna in accordance with an embodiment of the present invention.

FIG. 6 provides a perspective view of the front of one embodiment of antenna 100. The antenna 100 includes a planar element 110, which as described above with respect to FIG. 5A, may be steel or other suitably robust metals to provide a DC ground. Transmitting antenna systems generally need a properly functioning ground system to provide for proper operator safety and efficient radiation of the maximum amount of RF energy. Because embodiments of the present invention have the antenna at DC ground, insulating layers or other grounding means are unnecessary. The planar element can be mounted directly to a load backrest, which may simplify installation, reduce costs, and eliminate structurally weaker parts. Formed in planar element 110 are two notches 112, 114 that extend from holes 111 and 113, respectively, and flare to the top of the planar element. While the notches in FIG. 6 show a non-linear taper, other slot configurations are contemplated by the invention, such as, for example, a linear tapered notch or a non-tapered slot. The various shaped openings in the planar element 110 may be generally referred to as a notch. The preferred embodiment is a flared notch 112, 114 as it can provide a good impedance transition from the region of the transmission line coupling into the slot to the radiation environment of free-space.

A number of optional cutouts 115 are provided in the planar element 110 to, for example, provide improved operator visibility, reduce weight and/or reduce material costs (or form trademark indicia). Bolt holes 116 are similarly optional and may be provided to allow for mechanical mounting to the frame 26 (FIG. 5A) of the load backrest. Other mounting means, such as welding or clamping, would not require the use of bolt holes 116. Optional protective guards 118 are also shown in FIG. 6. The guards may be made of an insulating material, such as, for example, high-density polyethylene (HDPE), and are placed so as to prevent objects from being pinched or caught in the converging sides of the flared notches. The optional guards 118 may be affixed to either the front side of planar element 110 (as shown) or on the rear side. In another embodiment, the guards 118 may be integrated into the antenna notch to fill in at least part of the space formed by the notch, so that, for example, the guard 118 is flush with the front and/or back surface of planar element 110.

Figure 7:
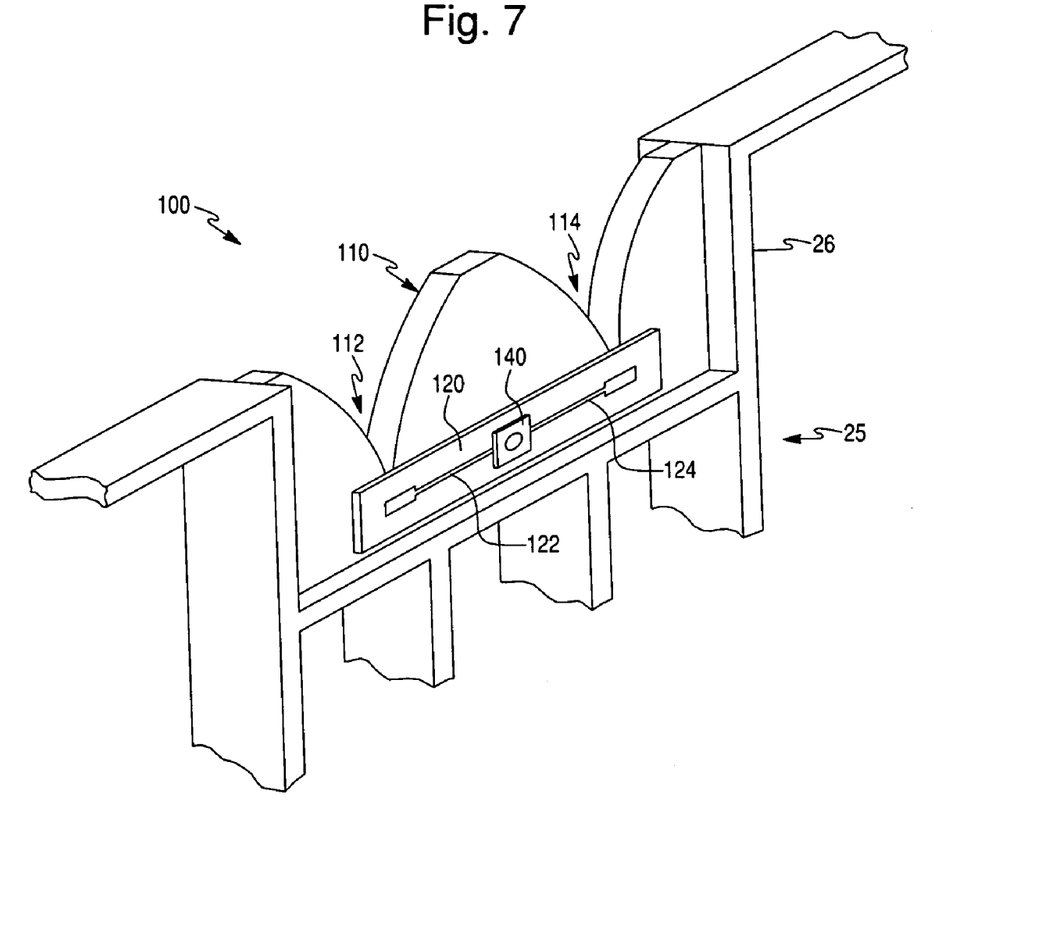
FIG. 7 provides a rear perspective view of a flared notch antenna in accordance with an embodiment of the present invention.

FIG. 7 provides a perspective view of the backside of an embodiment of antenna 100. The antenna is shown mounted on the load backrest 25 in a cutout formed by an embodiment of frame 26. The optional cutouts 115, bolt holes 116, and protective guards 118 shown in FIG. 6 are removed from FIG. 7 for clarity. A power distribution and feed circuit board 120 is mounted on the rear surface of the planar element 110, so that the feed circuit is essentially parallel to the planar element 110. The power distribution and feed circuit board 120 is a laminate construction made of materials that provides a controlled dielectric constant and low loss. A wide variety of materials will function, including polyethylene, polytetrafluoroethylene, (PTFE), polyisobulylene, silicon rubber, polystyrene, polyphenylene, alumina, beryllia and ceramic.

The power distribution and feed circuit board 120 includes feed lines or traces 122, 124 which are conventional microstrip transmission lines that can feed or couple RF energy into the narrow slot section of each respective flared notch 112, 114, near each respective hole (holes 111, 113 shown in FIG. 6). The narrow slot section of the flare is a region of low RF energy radiation and the narrow slot itself can be a transmission structure of RF energy as is the microstrip transmission line. The holes 111, 113 are effective as projecting an open circuit boundary to the narrow slot portion of the slot structure and effectively reverse the flow of the portion of RF energy flowing in the narrow slot toward the holes 111, 113 to the direction of the increasing slot width. Other materials and structures for the feed lines 122, 124 may be used, as are known in the art; while in some embodiments feed lines may not be required. In the embodiment shown in FIG. 7, the feed lines receive RF energy via a coaxial cable connection 140. The RF energy from the coaxial cable connection 140 is split between the feed lines 122 and 124 by a conventional power divider (not shown). Thus, the notches 112, 114 are coupled to form an array. A coaxial cable (not shown) may extend from connection 140 to a RFID radio transceiver 422 (FIG. 11) mounted, for example, either on the load backrest or elsewhere on the lift truck. In other embodiments, coaxial cable connection 140 can be eliminated in favor of direct soldering or coupling through other known connector means.

The radius and/or length of the flared notches 112, 114 can be varied for a given installation depending upon the desired signal pattern width. The planar element 110 of FIGS. 6 and 7 shows two flared notches 112, 114; however, a single notch or more than two notches could be used. Generally, the use of more than one notch element allows for improved pattern shaping of the RF signal; but the number of notches may be limited by other factors, such as the space available in a given load backrest configuration. For example, a single notch configuration may be sufficient in cases where the antenna is placed sufficiently close to the desired tag that to allow a low-power signal would only interpret the single tag. Conversely, planar elements with three or more notches may be desirable in instances where a more precise pattern is required and there is sufficient width to accommodate such an antenna structure.

Figure 8:
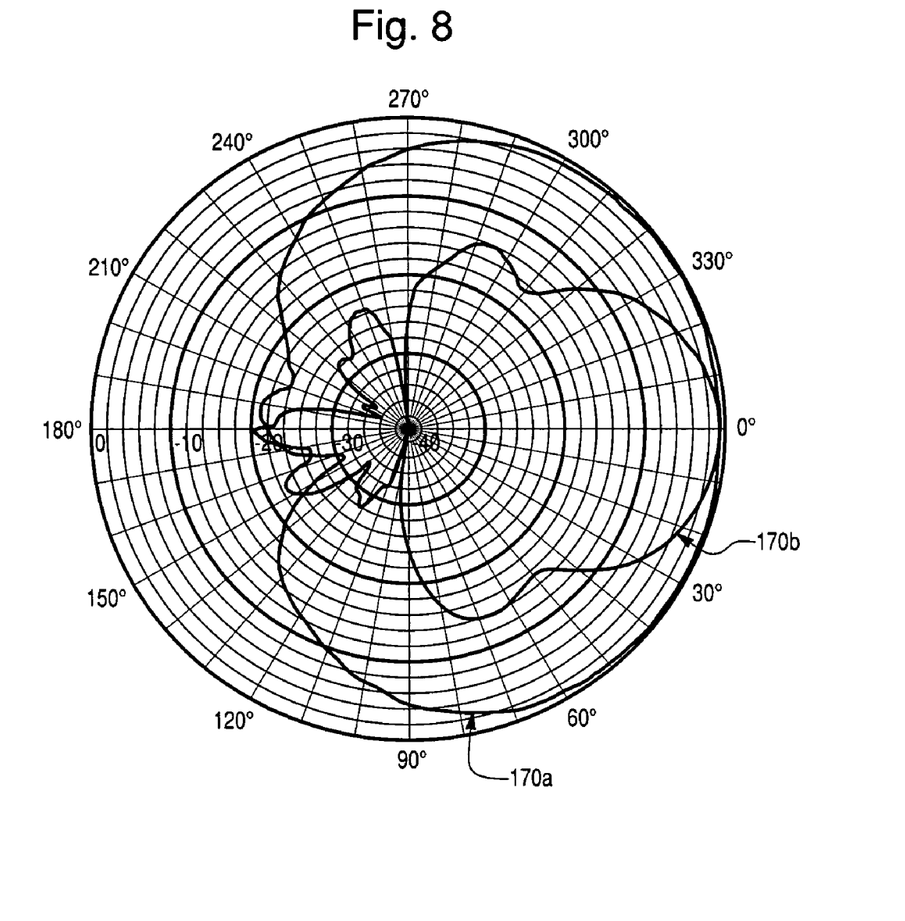
FIG. 8 provides a representative signal pattern of principal planes for the antenna configuration of FIGS. 6 and 7.

FIG. 8 provides a representative signal pattern for principle planes for the two-notch antenna embodiment shown in FIGS. 6 and 7. The pattern 170a for the H-plane (i.e., front-to-back respective to the lift truck) is significantly larger than the pattern 170b for the E-plane (i.e., side-to-side). In other words, the antenna produces a major lobe whose transverse cross-section has a large ratio of major to minor dimensions. In particular embodiments of the present invention, the ratio of major to minor dimensions at half power may be greater than or equal to 2. The spacing of the notches for a given installation may vary depending upon the wavelength of the RF transmission. For a signal frequency of approximately 900 MHz, for example, the notches 112 and 114 of FIG. 7 could be spaced about 8 inches (8") apart.

The following discussion refers to FIGS. 2-8 collectively. In the embodiment shown in FIGS. 5, 6 and 7, the antenna 100 has a linear polarization aligned with the primary (i.e., vertical) plane of the load back rest 25. Many conventional RFID tags 3 are also linearly polarized (LP). A LP RFID tag 3 may be placed overhead (such as the crosspiece of doorjamb 6 of FIG. 4A) or on a rack system (such as rack system 2 of FIG. 2) with the linear polarization aligned with the doorway or rack support structure (i.e., in the E-plane). This alignment is transverse to the direction of the lift truck 15 and can be defined as a horizontal linear polarization parallel to floor. As mounted on load rest 25, antenna 100 also has a horizontal linear polarization. Because antenna 100 has a matched polarization orientation (i.e., horizontal) and type (i.e., linear) with the RFID tags 3, the likelihood of a successful tag read is increased.

Figure 9:
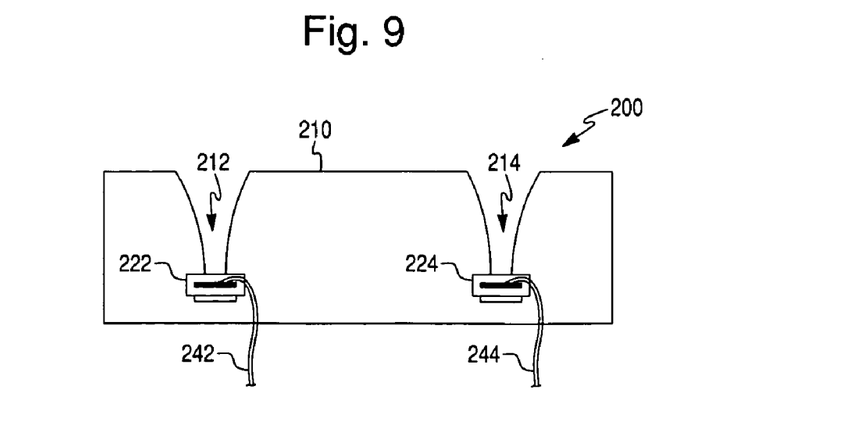
FIG. 9 provides a rear view of a flared notch antenna for WLAN in accordance with an embodiment of the present invention.

FIG. 9 shows rear view of an exemplary embodiment of a wireless local area network (WLAN) antenna system for mounting on the load backrest of a lift carriage, for use in communicating with a warehouse management system. The antenna system 200 includes a planar element 210, which may be steel or other suitably robust metals that provide a suitable electrical conductivity to serve as a DC ground. Formed in planar element 210 are two notches 212, 214 that flare to the top of the planar element 210. While the notches in FIG. 9 show a non-linear taper, other slot configurations are contemplated by the invention, such as, for example, a linear tapered notch, a non-tapered slot, or other opening. The various shaped openings in the planar element 210 may be generally referred to as a notch. As described with respect to the embodiment shown in FIG. 6, optional cutouts, bolt holes, and protective guards are similarly contemplated for embodiments of antenna 200. In FIG. 9, the planar element 210 may be mounted to the load backrest via any suitable means, including bonding, clamping, welding, or tongue-in-groove. Feed circuit boards 222, 224 are mounted using conventional methods on the rear surface of the planar element 210. Feed circuit board 222 is mounted across the base of flared notch 212; while feed circuit board 224 is mounted across the base of flared notch 214. In the embodiment shown in FIG. 9, each circuit board receives RF energy via separate coaxial cable. Feed circuit board 222 is connected to RF cable 224, and feed circuit board 224 is connected to RF cable 244. The coaxial cables 242 and 244 may extend from an Institute of Electrical and Electronics Engineers (IEEE) standard 802.11 wireless network radio 424 (FIG. 11) or other radio mounted, for example, either on the load backrest or elsewhere on the lift truck. The coaxial cables 242 and 244 may be detachably connected or permanently connected to their respective feed circuit boards 222 and 224.

Still referring to FIG. 9, the feed circuit boards 222 and 224 carry RF energy across the respective base portion of each respective flared notch 212, 214 to create two separate antennas. In the embodiment of FIG. 9, the two antennas (one at each of notches 212 and 214) are formed using the single planar element 210. The notches 212 and 214 are spaced at least approximately one wavelength and typically approximately two wavelengths apart to achieve a spatial diversity for combating fading due to multipath signal propagation between one or both of the WLAN antennas and an access point of the network and improve signal reception, as is generally known in the art. While the embodiment of FIG. 9 includes two WLAN antennas in planar element 210, a different number of antennas can be used. For example, a single antenna could be used, or three or more antennas could be used. The spacing of the notches for a given installation may vary depending upon the wavelength of the RF transmission. For a signal frequency of approximately 2.4 GHz, for example, the notches could be spaced at least about 5 inches (5") apart. The WLAN signals can use a number of options to communicate with the warehouse management system, and 802.11 networks or other wireless communication means.

Figure 10:
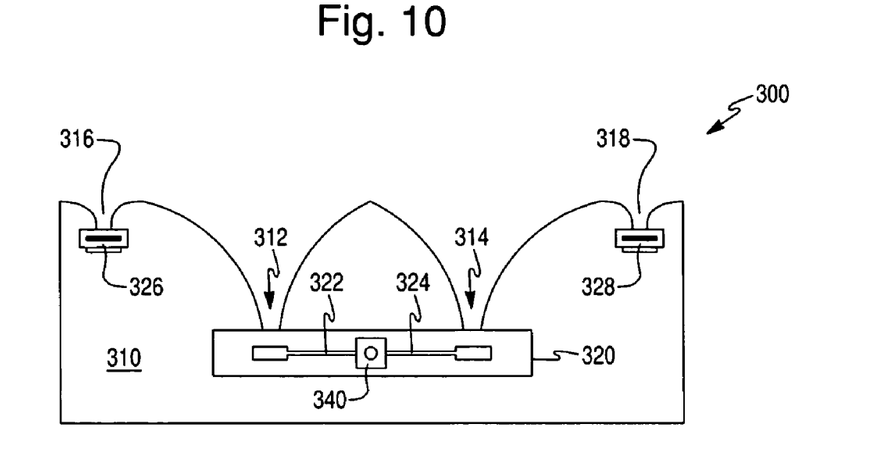
FIG. 10 provides a rear view of a combined antenna system for RFID and WLAN.

FIG. 10 shows rear view of an exemplary embodiment of an antenna system that incorporates both RFID tag reading and WLAN capabilities. As described in relation to previous figures, the antenna system is configured for mounting on the load backrest of a lift carriage, for use in communicating with a warehouse management system. The antenna system 300 includes a planar element 310 that incorporates two flared notches 312, 314 for RFID communications and two smaller flared notches 316, 318 for WLAN communications. Optional cutouts, bolt holes, and protective guards are contemplated for embodiments of the antenna 300, but are not shown for clarity. A RFID power distribution and feed circuit board 320 is mounted on the rear surface of the planar element 310. The power distribution and feed circuit board 320 includes feed lines 322, 324 which are conventional microstrip transmission lines that can feed RF energy across the base of each respective flared notch 312, 314, at a crossing location near each respective hole. In the embodiment shown in FIG. 10, the feed lines receive RF energy via a coaxial cable connection 340. In other embodiments, coaxial cable connection 340 can be eliminated in favor of direct soldering or other known coupling or connector means.

Still referring to FIG. 10, WLAN feed circuit boards 326, 328 are mounted on the rear surface of the planar element 310 by conventional means. The feed circuit board 326 is mounted across the base of flared notch 316; while feed circuit board 328 is mounted across the base of flared notch 318. Each circuit boards receives RF energy via separate coaxial cable (not shown) or other suitable cable. The coaxial cables may extend from an 802.11 network radio 424 (FIG. 11) mounted, for example, either on the load backrest or elsewhere on the lift truck.

Figure 11:
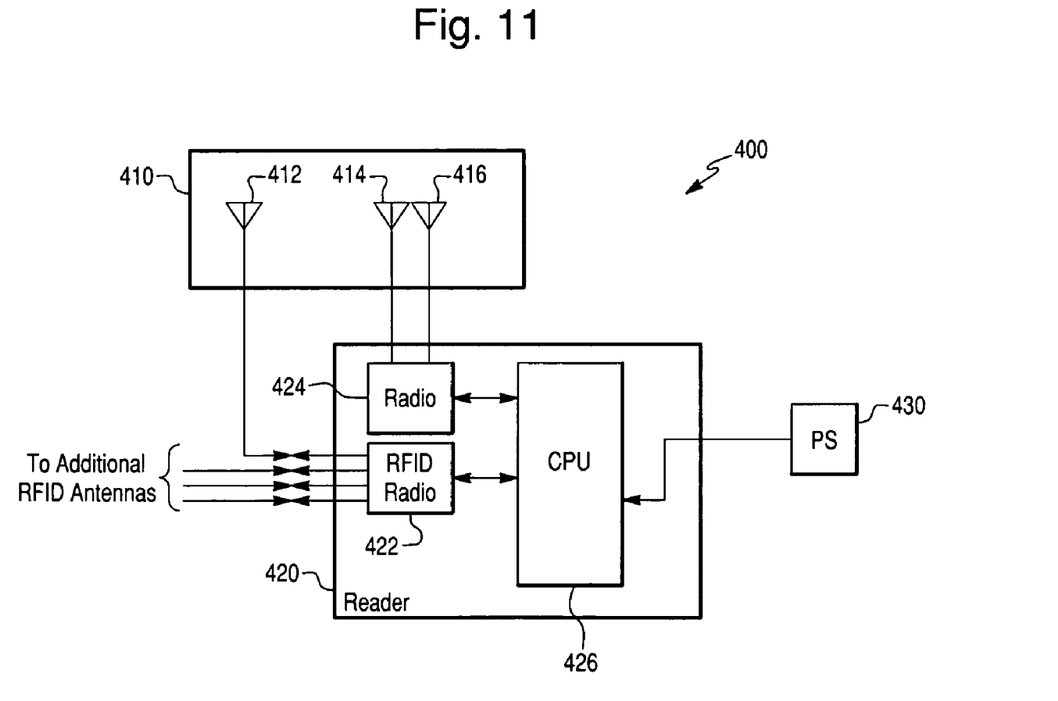
FIG. 11 provides a system block diagram for a forklift-mounted communication system utilizing an antenna system according to embodiments of the present invention.

FIG. 11 provides a system block diagram for a lift-truck-mounted communication system 400 utilizing an antenna system according to embodiments of the present invention. Ruggedized antenna structure 410 may be mounted at various locations on the lift truck, including, for example, on the load backrest of a forklift. The antenna structure 410 may include, for example, an upward looking dual notch RFID antenna 412 and two wireless network antennas 414, 416. While three antennas are shown as part of antenna structure 412 in FIG. 11, other antenna combinations are also contemplated within the scope of embodiments of the present invention. The RFID antenna is operatively connected to RFID radio transceiver 422; while the wireless network antenna 414, 416 are operatively connected to an wireless communications radio (e.g., an IEEE standards 802.11 radio) 424. The radio transceiver 422 and communications radio 424 may be housed or otherwise operatively connected to a central processing unit (CPU) 426 in a RFID reader 420. Signals from RFID antenna 412 are transmitted through the RFID radio transceiver 422 to a CPU 426. The CPU 426 interprets the RFID signal and transmits information to a warehouse management system (not shown) via wireless network radio 424 and antennas 414,416. The CPU may also contain a power source 430 for the radio transceiver 422 and communications radio 424 and antennas 412, 414, 416. As noted above with respect to FIGS. 4A and 4B, the power level of the RFID antenna 412 and/or reader 420 may be adjusted to suit particular applications, such as reading a RFID tag at a pallet location or reading a RFID tag at a loading dock door. The reader 420 may be located, for example, on the load rest of the lift truck, in the operator's cabin, or partially in each location. A power supply 430 from, for example, the forklift battery provides power for the communication system 400.

Figure 12:
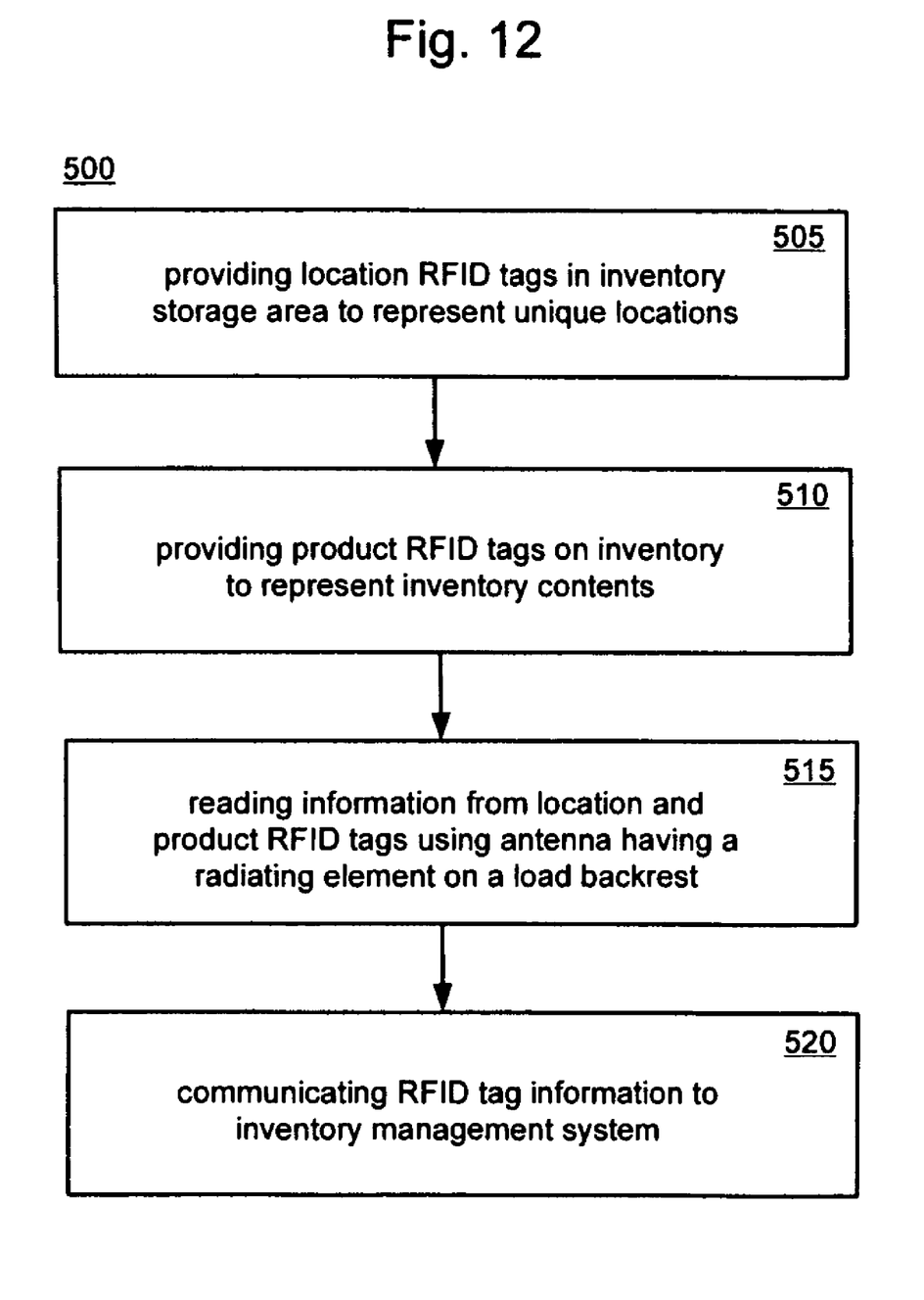
FIG. 12 provides a flow chart of a method of collecting inventory tracking data in according to an embodiment of the present invention.

FIG. 12 provides a flow chart for a method 500 of collecting inventory tracking data in a material handling environment according to an embodiment of the invention. Method 500 includes a first step 505 of providing location RFID tags in an inventory storage area. The location tags may be located throughout the storage area, such as on pallet storage shelves, dock doors and other points where knowledge of specific locations is desired. The location of the RFID tags may each represent a unique location in the inventory storage area; or, in some cases, a group of tags could be used to represent a unique area. In step 510, product RFID tags are provided on the inventory. Product RFID tags represent inventory contents and may have, for example, a single tag for an entire pallet, multiple tags on different places throughout the pallet contents, or tags on each inventory segment on the pallet. In step 515, information from the location RFID tags and the product RFID tags is read using an RF signal transmitted from an antenna having a radiating element on a load backrest of a lift carriage and having a substantially uniform voltage distribution across the radiating element at low frequency. In an alternative embodiment, step 515 may include reading location tags using an antenna mounted on the load-rest, while product RFID tags may be read using a separate antenna located elsewhere on the lift truck. In step 520, the RFID tag information is communicated to the inventory management system. RFID tag information may be communicated using a wireless network antenna co-located on the radiating element of the load backrest antenna to send a second RF signal. Alternatively, the wireless network antenna may be located elsewhere on the lift truck.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

The invention claimed is:

1. An antenna element for use on the load backrest of a lift truck, comprising:
   a radiating element of conducting material having a substantially uniform voltage distribution across the radiating element at low frequency; and
   a radio frequency feed line, the feed line being coupled across an opening in the radiating element, wherein the radiating element is affixed to a portion of said load backrest so as to project at least one radio frequency signal in an essentially upward direction.

2. The antenna element of claim 1, wherein the radiating element is configured for mounting on the load backrest so as not to protrude into a plane of a load area of the lift truck.

3. The antenna element of claim 1, wherein said radiating element is affixed to the load backrest by at least one of welding, clamping, bolting and tongue-in-groove mounting.

4. The antenna element of claim 1, wherein the radiating element is a planar element and the opening of said planar radiating element is a notch formed therein and said feed line is coupled across the notch.

5. The antenna element of claim 4, wherein the material of the planar radiating element is at least one-eighth inch (⅛") thick steel.

6. The antenna element of claim 4, wherein the planar radiating element includes cutouts.

7. The antenna element of claim 4, wherein the feed line is coupled to an opening to project and/or receive a signal for communication with a wireless network.

8. The antenna element of claim 7, wherein said signal is transmitted over an IEEE standard 802.11 wireless network.

9. The antenna element of claim 7, wherein said planar radiating element has a second notch and a second feed line, and wherein each feed line coupled across each of the notches is for a wireless network.

10. The antenna element of claim 4, wherein the feed line is adapted for a RFID tag reader, wherein the radio frequency signal is projected from the notch in a generally upward direction.

11. The antenna element of claim 10, wherein said planar radiating element has a second notch, the first and second notches being coupled to form an array.

12. The antenna element of claim 11, wherein the first and second notches are flared notches and the effective read zone of said projected radio frequency signal is limited to essentially the width of a dock door.

13. The antenna element of claim 10, wherein the projected radio frequency signal has a major lobe with a transverse cross-section that has a ratio of major to minor dimensions greater than or equal to 2.

14. The antenna element of claim 10, wherein at least a second feed line is coupled to a second opening to project and/or receive a signal for communication with a wireless network.

15. The antenna element of claim 4, wherein the planar radiating element comprises a first and a second notch, the first and the second flared notch coupled to a feed line adapted for a RFID tag reader, and further comprising a third opening, the third opening coupled to a feed line adapted to transmit and/or receive a wireless network signal.

16. The antenna element of claim 1, wherein the antenna element is uncovered.

17. The antenna element of claim 1, wherein the antenna element is uncovered.

18. A load backrest for a lift truck, comprising:
    a frame adapted for connection to an lift carriage and extending in a generally vertical plane above the carriage; and
    an antenna configured to have substantially uniform voltage distribution across the radiating element at low frequency and to be in essentially the same vertical plane as said frame, said antenna having a radiating element of conducting material with at least one opening, said radiating element configured to project at least one radio frequency signal.

19. The load backrest of claim 18, wherein said frame further comprises a mounting bracket to receive said antenna.

20. The load backrest of claim 18, wherein the radiating element is configured for mounting on the load backrest so as not to protrude into a plane of a load area of the lift truck.

21. The load backrest of claim 18, wherein the radiating element is a planar element and the opening of said planar radiating element is at least one notch formed therein.

22. The load backrest of claim 21, wherein the planar radiating element includes cutouts.

23. The load backrest of claim 21, further comprising at least one feed line coupled to the opening to project or receive a signal.

24. The load backrest of claim 23, wherein said signal is an wireless network signal for communication with a warehouse management system.

25. The load backrest of claim 23, wherein said opening is a notch and said signal is for a RFID tag reader.

26. The load backrest of claim 25, wherein the projected signal at half power has a major lobe with a transverse cross-section that has a ratio of major to minor dimensions greater than or equal to 2.

27. The load backrest of claim 26, further comprising at least a second feed line coupled to a second opening to project or receive a wireless network signal for communication with a warehouse management system.

28. A data collection system for a powered industrial truck with a lift carriage, said system comprising:
    a load backrest mounted to said lift carriage, said load backrest including an integrated antenna with a radiating element configured to have substantially uniform voltage distribution across the radiating element at low frequency and having an opening configured for projecting at least one radio frequency signal;
    a feed line coupled to the opening to communicate a signal for reading a RFID tag;

a RFID tag reading system including a RFID radio and a CPU; and a power source for said reader and said antenna.

29. The data collection system of claim 28, further comprising a second feed line coupled to a second opening to communicate a signal for a wireless network, and wherein said reader further includes a wireless network radio.

30. The data collection system of claim 28, wherein the second one of the openings is vertical slot for communicating over an 802.11 network.

31. The data collection system of claim 28, wherein the opening is a flared notch to project the signal in a predominantly upward direction.

32. A method of collecting inventory tracking data in material handling environment, said method comprising the steps of:

providing location RFID tags in an inventory storage area, wherein the location RFID tags represent unique location in the inventory storage area;

providing product RFID tags on the inventory, wherein the product RFID tags represent inventory contents;

reading information from the location RFID tags and the product RFID tags using an RF signal transmitted from an antenna having a radiating element on a load backrest of a lift carriage and having a substantially uniform voltage distribution across the radiating element at low frequency; and communicating the RFID tag information to an inventory management system.

33. The method of claim 32, wherein the signal transmitted from the antenna is a RF signal that has, at half power, a major lobe with a transverse cross-section that has a ratio of major to minor dimensions greater than or equal to 2.

34. The method of claim 32, wherein the step of communicating the RFID tag information is conducted using a wireless network antenna co-located on the radiating element to send a second RF signal.

35. The method of claim 32, wherein the radiating element is configured to project the RF signal transmitted from the antenna in a predominantly upward direction.

36. The method of claim 32, wherein said antenna has a linear polarization aligned with the primary plane of the load backrest.

37. A method for reading an overhead RFID tag using an antenna mounted on a lift truck, comprising:

projecting in a predominantly upward direction a first RF signal having, at half power, a major lobe with a transverse cross-section having a ratio of major to minor dimensions greater than or equal to 2, wherein said lift truck includes a front, a back, a first side, and a second side, and wherein said major dimension is parallel to a direction extending from the front of said lift truck to the back of said lift truck, and wherein said minor dimension is parallel to a direction extending from the first side of said lift truck to the second side of said lift truck;

receiving a second signal from the RFID tag; and transmitting the second signal to a RFID reader.

38. The method of claim 37, wherein said antenna has a radiating element having a substantially uniform voltage distribution across the radiating element at low frequency.

39. The method of claim 37, wherein information about the second signal is transmitted to an inventory management system using a wireless network antenna co-located on the radiating element.

40. The method of claim 37, wherein the antenna has an adjustable power level and the power level is adjusted to allow for accurate RFID tag reading in different applications.

41. A RFID antenna for a lift truck, comprising:

a planar radiating element on an essentially-vertically-oriented load backrest, said radiating element oriented transverse to the primary direction of travel of said lift truck, said radiating element having a substantially uniform voltage distribution across the radiating element at low frequency, and said antenna having a linear polarization aligned with the primary plane of the load back rest and is configured for projecting an electromagnetic signal in predominantly an upward direction.

42. The antenna element of claim 41, wherein the radiating element is configured on the load backrest so as not to protrude into a plane of a load area of the lift truck.

43. The antenna element of claim 41, wherein said element is affixed to the load backrest by at least one of welding, bolting and tongue-in-groove mounting.

44. A WLAN antenna for a lift truck, comprising:

a planar radiating element on an essentially-vertically-oriented load backrest, said radiating element oriented transverse to the primary direction of travel of said lift truck, said radiating element having a substantially uniform voltage distribution across the radiating element at low frequency, and said antenna having a linear polarization aligned with the primary plane of the load back rest.

45. A dual band antenna element, comprising:

a radiating element of conducting material having a substantially uniform voltage distribution across the radiating element at low frequency, said radiating element comprising a first opening and a second opening; and a first radio frequency feed line coupled across said first opening in the radiating element, to radiate a radio frequency signal at a first frequency in essentially an upward direction;

a second radio frequency feed line coupled across said second opening in the radiating element, wherein the radiating element is configured for projecting a second radio frequency signal.

46. The antenna element of claim 45, wherein the material of the radiating element is at least one-eighth inch (1/8") thick steel.

47. The antenna element of claim 45, wherein the radiating element is a planar radiating element.

48. The antenna element of claim 45, wherein the first feed line is adapted for an RFID tag reader.

49. The antenna element of claim 48, wherein the feed line is coupled to an opening to project and/or receive a signal for communication with a wireless network.

50. The antenna element of claim 45, wherein said radiating element has a third opening, the first and third openings being coupled to said first feed line to form an array.

51. The antenna element of claim 50, wherein the first and third openings are flared notches and the effective read zone of said projected radio frequency signal from said first and third openings has, at half power, a major lobe with a transverse cross-section that has a ratio of major to minor dimensions greater than or equal to 2.

* * * * *